United States Patent [19]
Jelinek et al.

[11] 3,738,670
[45] June 12, 1973

[54] SECTIONAL GASKET

[75] Inventors: Jerry G. Jelinek, La Habra; Charles R. McNamee, Los Angeles, both of Calif.

[73] Assignee: Parker-Hannifin Corporation, Cleveland, Ohio

[22] Filed: Sept. 27, 1971

[21] Appl. No.: 183,975

[52] U.S. Cl. ............... 277/199, 277/166, 277/211, 49/482
[51] Int. Cl. ..................... F16j 15/00, F16j 9/16
[58] Field of Search ................. 277/199, 211, 221, 277/207, 235 R, 166; 49/482, 435, 479

[56] References Cited
UNITED STATES PATENTS

| | | | |
|---|---|---|---|
| 3,528,668 | 9/1970 | Barton | 277/235 X |
| 3,175,832 | 3/1965 | Carrell | 277/199 |
| 3,029,480 | 4/1962 | Signorelli et al. | 49/479 |
| 1,986,465 | 1/1935 | Dempsey | 277/199 |

*Primary Examiner*—Samuel B. Rothberg
*Attorney*—John N. Wolfram

[57] ABSTRACT

A gasket of joined sections, each section having a tongue and recess with the tongue of one section receivable in the recess of another section, the tongues and recesses having engageable side walls of resilient material for preventing leakage through the joint, the recess side walls being parallel so as to be sealingly engaged by the tongue side walls regardless of the distance that the tongue is entered into the recess, and opposed faces of each section having raised resilient lips along the edges thereof with lip portions along the edges of the tongues and recesses being deformable into sealing engagement with each other.

22 Claims, 5 Drawing Figures

PATENTED JUN 12 1973 3,738,670

SECTIONAL GASKET

BACKGROUND OF THE INVENTION

The manufacture, storage and handling of unitary gaskets of large size can be expensive, particularly if gaskets that are a combination of metal and rubberlike material. To avoid these disadvantages, gaskets have been made in sections that may be joined together to provide a wide variety of sizes and outline shapes. Sectional gaskets of this general type are shown, for example, in U.S. Pat. No. 3,175,832.

In such prior sectional gaskets, interlocking joints between the sections have been provided but such joints have required an endwise abutting relationship of the resilient portions to be prevent leakage between the sections. Such endwise abutment can have no play therebetween as otherwise the joint would leak. Also, the resilient member has been in the form of a narrow raised lip for high unitary sealing pressure, such lip being along the center of the metallic member. The end to end abutment to the narrow lip provides only a small area of endwise sealing contact which requires that the lip of one section be very accurately aligned with the lip of the next section.

SUMMARY OF THE INVENTION

The above mentioned shortcomings of prior sectional gaskets of combination materials, such as metal and rubber, are overcome by the present invention in that sidewise engagement of axial overlapping portions of the resilient material of adjacent sections is provided instead of endwise abutment and there is a sealing lip along the inner and outer edges of each section rather than along the center so that in effect there is an inner lip and an outer lip on each face of the gasket that can seal independently of the other.

DETAILED DESCRIPTION

Figure 1:
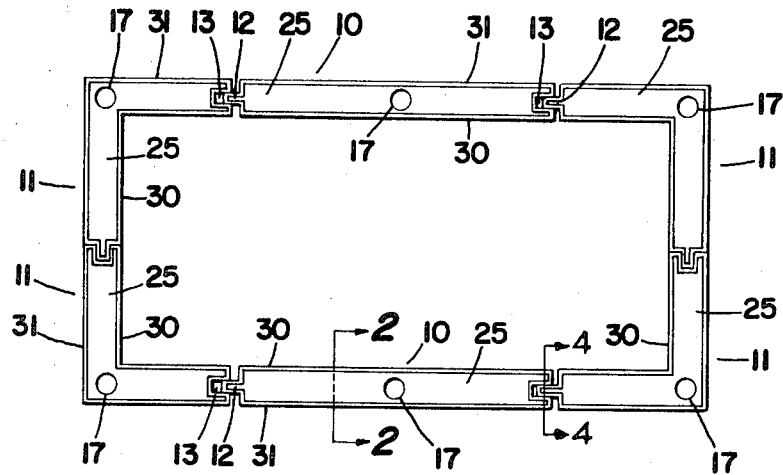
FIG. 1 is a plan view of a gasket made up of sections in accordance with the present invention.
Figure 2:
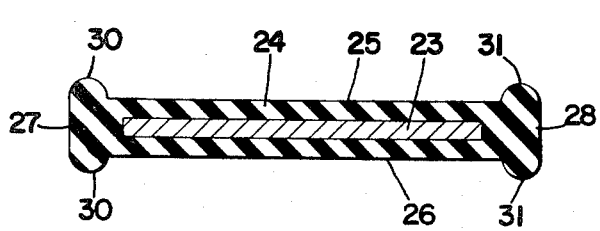
FIG. 2 is an enlarged sectional view on line 2—2 of FIG. 1.

The sectional gasket shown in FIG. 1 comprises a series of straight sections 10 and corner sections 11. Each section has a tongue 12 at one end and a recess 13 at the other end, with each tongue being received in the recess of the ajoining section. Each section may have a hole 17 therethrough for receiving bolts (not shown) by means of which the gasket may be clamped between a pair of members 19, 20 (FIG. 5) to be sealed by the gasket.

Each section 10, 11 has a core plate 23 of metal or other relatively rigid material and is preferably completely covered on all surfaces with rubberlike or resilient material 24. The cover provides opposed flat faces 25, 26, inner and outer marginal or edge portions 27, 28 and raised inner and other lip portions 30, 31 projecting from each face 25, 26. Lips 30, 31 are rounded and merge with the peripheral portions of inner and outer edge portions 27, 28.

Each tongue 12 includes a rigid core portion 35 that is completely covered with resilient material and has an inner and outer straight parallel side faces 36, 37 that initially have an interference fit with the resilient material on straight parallel inner and outer side faces 41, 42 of the mating recess 13.

Each tongue 12 on each face has inner and outer lip portions 44, 45 that respectively merge with transverse portions 33, 34, which in turn respectively join with inner and outer lips 30, 31.

At the sides of each recess 13 and projecting from faces 25, 26 are lip portions 48, 49 that meet with lip portions 50 extending across the bottom of the recess, and also meet with transverse portions 33, 34 that in turn meet with inner and outer lip portions 30, 31. The lip portions are all rounded and of uniform height and are so joined as to form a continuous lip around each face of each section.

Figure 3:
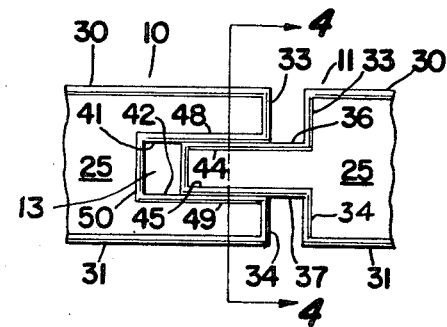
FIG. 3 is an enlarged planned view of the joint between sections.
Figure 4:
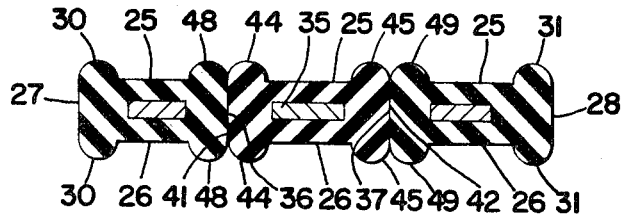
FIG. 4 is an enlarged sectional view on the line 4—4 of FIG. 3.

When a tongue 12 is inserted into a recess 13, as shown in FIGS. 3, 4, the side surfaces 36, 37 of the tongue make sealing contact with the side surfaces of the recess to prevent leakage through the joint. Moreover, because the sides of the tongues and recesses are straight and parallel, the side surfaces makes such sealing contact regardless of the distance that the tongue is inserted into the recess, therefore the sections need not have a precise endwise fit with each other.

Figure 5:
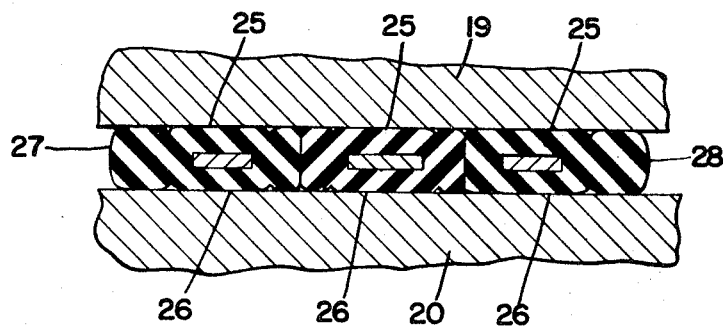
FIG. 5 is a section view corresponding to FIG. 4 but showing the gasket clamped between parts to be sealed.

When the gasket is placed between members 19 and 20 to be sealed and the joint is tightened, the lips will establish sealing contact with the members and will be deformed as shown in FIG. 5 so that substantially the entire surface of each face 25, 26 will be in contact with the respective member 19, 20. However, the unit contact pressure between the lip portions and the members will be greater than between the members and faces 25, 26 between the lip portions, with the inner lip portions 44, 33, 30, 33 and 41 of any one section providing a first seal against leakage across the respective face 25, 26 of the section and with outer lip portions 37, 34, 31 providing a secondary seal across such faces in the event the primary seal does not function properly. If bolt holes 17 are provided between the inner and outer sealing lips, it is, of course, necessary to seal the bolts so that the outer sealing lips can be effective.

Likewise, engagement of inner tongue and recess sides 36 and 41 provides a first seal against leakage through the tongue and groove joint and engagement of outer sides 37 and 42 provide a second seal as a backup for the first seal.

With the joint clamped tight, as shown in FIG. 5, the adjacent inner sealing lips 44, 48 and the outer adjacent sealing lips 45, 49 on the tongue and recess portions are deformed so as to be in tight sealing engagement with each other whereby there is no gap between the ajoining lips at any point between members 19 and 20.

I claim:

1. In a sectional gasket, first and second sections having axially overlapping side edges sealingly engageable with each other and each section having a sealing lip along its edge so overlapped, and said lips being deformable into sealing engagement with each other.

2. The gasket of claim 1 in which each section has a first clamping face from which the respective lip projects.

3. The gasket of claim 1 in which said lips are of elastomeric material.

4. The gasket of claim 1 in which each section comprises a part of rigid material and said lips edges are of resilient material mounted on said rigid part.

5. The gasket of claim 2 in which each section has a second clamping face opposite the first clamping face from which other lips project along the respective edge, and said other lips being of elastomeric material and deformable into sealing engagement with each other.

6. In a sectional gasket, first and second sections each having an end with a recess and an end with a tongue, the tongue of one section being receivable in the recess of the other section with a side edge of the tongue in sealing engagement with a side edge of the recess, and a lip along said side edge of the tongue and a lip along said side edge of the recess, said lips being deformable into sealing engagement with each other.

7. A gasket in accordance with claim 6 in which each section has an edge completely surrounding the same and which includes said tongue and recess edges of the respective section, and the lip on each section extends completely around the section along the entire edge thereof.

8. The gasket of claim 7 in which each of said lips is of resilient material projecting from a face of the respective section and merges with the respective section edge.

9. In a sectional gasket, a first section having a tongue and a second section having a recess in which the tongue is received, said tongue having a pair of side edges having initial interference fits with a pair of parallel side edges of said recess, and one of said pair of side edges being of resilient material that is deformed into sealing engagement with the other pair of side edges, at least one of said sections comprising a rigid member having said resilient material mounted thereon.

10. The gasket of claim 9 in which both of said pairs of side edges are of resilient material.

11. The gasket of claim 9 in which at least one of the tongue side edges and the adjoining recess side edge has a lip adjacent thereto, and said lips are deformable into sealing engagement with each other.

12. The gasket of claim 9 in which each of said tongue and recess side edges has a lip adjacent thereto and the lips on the tongue side edges are deformable into engagement with the adjoining lip on the recess side edges.

13. The gasket of claim 9 in which said tongue side edges are parallel.

14. The gasket of claim 9 in which said first and second sections each comprise a rigid member having a tongue and recess and having elastomeric material mounted thereon to form said side edges.

15. In a sectional gasket first and second sections each having a core section of rigid material, each core having a tongue at one end that has a pair of side edges and having a recess at the other end having side edges, each of said edges being covered with resilient material, the tongue of one section being received in the recess of the other section with the resilient material on the side edges of the tongue in sealing engagement with the resilient material on the side edges of the recess.

16. The gasket of claim 15 in which the side edges of the recess are parallel and the resilient covering thereon is of substantially uniform thickness throughout the length of said recess side edges.

17. The gasket of claim 16 in which the tongue side edges are parallel and the resilient covering thereon is substantially uniform in thickness throughout the length of said tongue side edges.

18. The gasket of claim 15 in which said cores each has a pair of opposed flat faces, and each face has resilient material mounted thereon.

19. The gasket of claim 18 in which each face has a lip of resilient material projecting therefrom and completely surrounding the respective face.

20. A section for a sectional gasket, said section having a tongue at one end and a recess at the other end, said section comprising a member of rigid material, said tongue and said recess each having a pair of side edges, at least one of said side edges being of elastomeric deformable material mounted on said rigid material.

21. The section of claim 20 in which said tongue and said recess each have another side edge parallel to the respective first mentioned side edge, and all of said side edges are of elastomeric deformable material mounted on said rigid material.

22. The section of claim 21 in which there is a lip of elastomeric material projecting transversely from each of said side edges.

* * * * *